United States Patent

Yokokawa et al.

[11] 4,000,108
[45] Dec. 28, 1976

[54] SILICONE RESIN MOLDING COMPOSITIONS

[75] Inventors: Kiyoshi Yokokawa; Yasuhisa Tanaka; Jun Koizumi; Noboru Shimamoto; Tokio Sekiya, all of Annaka, Japan

[73] Assignee: Shinetsu Chemical Company, Tokyo, Japan

[22] Filed: Sept. 30, 1974

[21] Appl. No.: 510,703

[30] Foreign Application Priority Data

Oct. 4, 1973 Japan .................. 48-111748

[52] U.S. Cl. .................. 260/37 SB; 260/2.5 S
[51] Int. Cl.$^2$ .................. C08L 83/04
[58] Field of Search .......... 260/37.5 B, 2.5 S, 2.5 B

[56] References Cited

UNITED STATES PATENTS

| | | | |
|---|---|---|---|
| 2,806,509 | 9/1957 | Bozzacco et al. | 260/37 SB |
| 2,978,340 | 4/1961 | Veatch et al. | 260/37 EP X |
| 3,595,825 | 7/1971 | Miller | 260/37 SB X |
| 3,792,012 | 2/1974 | Zdaniewski | 260/37 SB |

OTHER PUBLICATIONS

Freeman; Silicones; Iliffe Books Ltd.; 1962; pp. 48, 49.

*Primary Examiner* — Lewis T. Jacobs
*Attorney, Agent, or Firm* — Toren, McGeady and Stanger

[57] ABSTRACT

Silicone resin-based molding compositions filled with spherical glass bodies, i.e., void-free glass beads or hollow glass spheres, have the possibility to give molded articles colored in white or light-tone colors different from conventional molding compositions filled with other inorganic fillers which are rather highly abrasive against metal surfaces of the apparatus employed for processing the molding compositions and which causes dark stains to the molding compositions leading to the necessity to color them in black or dark-tone colors in order to mask the stains. The molded articles fabricated with the molding compositions of the present invention colored in white or light-tone colors are very attractive where sanitary cleanliness or fashionableness is important.

3 Claims, No Drawings

SILICONE RESIN MOLDING COMPOSITIONS

FIELD OF THE INVENTION

This invention relates to a silicone resin-based molding composition, or in particular, to a novel silicone resin-based molding composition capable of giving molded articles of very beautiful appearance, free of noticeable stains and colored in white or light-tone colors.

DESCRIPTION OF THE PRIOR ART

As is well known in the prior art, silicone resin-based molding compositions are widely used for the manufacture of various electric and mechanical parts with high heat resistance because of their excellent properties in thermal stability, flame-proofness, electric properties and water-proofness, compared to molded articles made of conventional molding compositions based on the ordinary organic thermosetting resins such as phenol resins, epoxy resins, diallylphthalate resins and unsaturated polyester resins.

With respect to the formulation of the silicone resin-based molding compositions, organopolysiloxane resins having functional groups for crosslinking such as silicon-bonded hydroxy groups and vinyl groups are admixed with various kinds of additive ingredients such as inorganic fillers, for example, diatomaceous earth, fused quartz powder, clay, fumed silica, finely pulverized glass powder, magnesium oxide, titanium dioxide and alumina, reinforcing materials, for example, chopped glass fibers and glass cloths cut into pieces, curing accelerators, pigments, mold release agents, etc.

In the practical procedure for the preparation of the silicone resin-based molding compositions, fused silicone resins are blended with fillers, reinforcing materials and other additives by means of a blending apparatus such as hot rollers, Bumbury's mixers, kneaders, extruders and high-speed blenders, followed by pelletizing or crushing to granules.

Alternatively, all of the ingredients except the reinforcing materials are dissolved or dispersed into a suitable organic solvent, and with the dispersion glass yarns, glass rovings, glass cloths or glass mats are impregnated by dipping, spraying or brushing, followed by subjecting the solvent to evaporation. The glass yarns or glass rovings thus impregnated and dried are then cut in 1 to 6 mm lengths to give compositions for the press molding, while glass cloths or glass mats thus impregnated and dried are used as prepregs for the preparation of laminates.

Recently, the molded articles of silicone resin-based molding compositions have found wider uses in medical instruments, electric devices for household use or cooking apparatuses because of their excellent heat resistance and electric properties since safety has been regarded as more and more important in electric instruments. Further, it is required from the standpoint of sanitary cleanliness and fashionableness for sales promotion to have molded articles colored in white or light-tone colors. Despite the advantage of silicone resins over the other thermosetting resins that the silicone resins are themselves transparent or very lightly colored so that they may be colored in any desired colors, it is usual that most of the commercialized silicone resin-based molding compositions are disadvantageously colored in black, grey or dark brown colors. The necessity of dark coloring is in the masking of the dark or blackish stains in spots or streaks created during the blending process by the wearing out of the metal surfaces of the blending apparatus in which the molding composition composed of the silicone resin in molten state, inorganic fillers and reinforcing materials are blended with a high shearing force between the metal surface of the apparatus and the inorganic filler working as if it were a strong material against the metal surface.

In order to overcome the above-described problems, the methods to decrease the wearing of the metal surface have been proposed by shortening the time required to blend the ingredients, in which the consistency of the mixture is reduced by blending at higher temperatures or by utilizing silicone resins of a lower viscosity. These methods, however, do not produce a thorough mix of the compositions and, especially when the composition includes a curing agent, the high temperature blending leads to the undesirable excessive crosslinking reaction taking place during the blending, causing the molding of the composition to become impossible. When silicone resins of a lower viscosity are employed, the resulting compositions are so sticky that their handling is difficult.

Further, in an alternative procedure of preparing molding compositions in which various substrate materials impregnated with the silicone resin composition are cut into pieces, strong shearing in cutting between the resin-impregnated materials and the metal surface of the cutting tools gives rise to the adherence of dark-colored dirty material at the section of the dissected pieces and the articles molded therefrom tend to have dark stains in spots or in streaks also. Thus, the addition of black or dark brown pigments in the compositions is indispensable for masking the dark-colored stains and, therefore, no white or light-tone colored compositions are available.

Besides the above circumstances, the metallic molds employed in the press molding process for the molding compositions wear out due to the strong shearing force added between the metallic mold and the flowing molten composition, and the surface of the molded article is contaminated with the dark stains coming from the surface of the metallic mold, resulting to produce a very disagreeable appearance to the molded articles. The stains from the metallic mold are especially remarkable in the case of the transfer or injection molding where the molten compositions are forced through narrow slits in high speed. The gate and runner of the metallic mold employed in the transfer or injection molding become heavily worn out by the conventional silicone resin-based molding compositions and, in order to avoid this disadvantage, it is required that the gates and runners should be made of expensive materials of special hardness having high resistance to wearing.

OBJECTS OF THE INVENTION

The object of the present invention is to present a silicone resin-based molding composition filled with spherical glass bodies as the filler, capable of giving molded articles having excellent mechanical properties and very attractive appearance of white or light-tone colors.

Another object of the present invention is to present a silicone resin-based molding composition filled with such spherical glass bodies that the pH value of water containing said spherical glass bodies dispersed therein is alkaline, capable of giving molded articles free from any poisonous ingredients and with excellent mechanical properties and very attractive appearance of white or light-tone colors by heat-curing without the addition of conventional curing catalysts which are often compounds of poisonous heavy metals.

BRIEF SUMMARY OF THE INVENTION

According to the invention, the silicone resin-based molding composition comprises organopolysiloxane resin and spherical glass bodies as well as curing agents, lubricants, mold-release agents, stabilizers, pigments, etc., if necessary. The present invention also involves molding materials suitable for feeding molding machines, prepared by chopping glass yarns or glass rovings impregnated with the compositions above described and prepregs suitable for lamination prepared by impregnating glass cloths or glass mats with the compositions above described.

DETAILED DESCRIPTION

To further describe the invention, the molding composition of the present invention consists essentially of an organopolysiloxane resin represented by the general formula

where R is a substituted or unsubstituted monovalent hydrocarbon group and n is a positive number between 1.0 and 1.6 and a spherical glass body. The molding composition may, if necessary, contain additionally other additives such as curing agents, mold-release agents, lubricants, stabilizers, pigments, and glass fiber reinforcing materials, for example, glass yarns, glass rovings, glass cloths and glass mats.

The organopolysiloxane resins contained in the molding compositions of the present invention, represented by the above-mentioned general formula, are classified into two groups in accordance with curing mechanisms. One is of the condensation curing type which is cured by the action of several catalysts including organic acid salts of metals such as lead, zinc and tin, amines and their organic acid salts, and combinations of an inorganic lead compound and an organic acid. The other is of the vinyl polymerization type which is cured by organic peroxides such as benzoyl peroxide and dicumyl peroxide.

In the organopolysiloxane resins of the condensation curing type, it is preferred that at least 0.25% by weight of hydroxy groups directly bonded to silicon atoms is contained to achieve satisfactory curing of the resin and that most of the organic groups represented by the symbol R in the above-mentioned general formula are methyl and phenyl groups to achieve a good thermal stability. On the other hand, in the organopolysiloxane resins of the vinyl polymerization type, it is preferred that the molar ratio of the vinyl groups to the silicon atoms (vinyl)/Si is between 0.02 and 0.5 and that there are not so many hydroxy groups bonded to the silicon atoms contained in the molecule as in the case of the condensation curing type polysiloxane.

The organic groups represented by the symbol R in the above-mentioned formula are exemplified by monovalent hydrocarbon groups including alkyl groups such as methyl, ethyl, propyl and butyl, aryl groups such as phenyl, tolyl and xylyl, aralkyl groups such as benzyl and phenylethyl, aralkenyl groups such as styryl, cycloalkyl groups such as cyclopentyl and cyclohexyl, and their substituted groups such as cyanoethyl, chloropropyl and chlorophenyl. The numeral n in the same formula is a number between 1.0 and 1.6, and it is preferably between 1.0 and 1.4 from the standpoint of the curing velocity and the stability of the finished product.

The organopolysiloxanes suitable for the formulation of the composition of the present invention can be readily prepared by any known methods in which mixtures of several organochlorosilanes and/or organoalkoxysilanes, for example, methyltrichlorosilane, vinyltrichlorosilane, dimethyldichlorosilane, phenyltrichlorosilane, diphenyldichlorosilane and methylphenyldichlorosilane and their substitution products with alkoxy groups, are co-hydrolyzed and then subjected to dehydration condensation, if necessary, by heating.

The spherical glass bodies suitable for the formulation of the composition of the present invention include void-free spheres known as glass beads or hollow glass spheres. The preferred size of such glass spheres is smaller than 200 μm, preferably 100 μm in diameter, since glass spheres with a larger size tend to separate out from the organopolysiloxane resin as the matrix and the structure of the molded articles obtained from those compositions containing the coarser glass spheres will be inhomogeneous. The softening temperature of the glass spheres is preferably higher than 300° C, since the molding composition of the present invention should be processed and molded at relatively high temperatures.

The spherical glass bodies used according to the invention should be composed of particles of substantially true spherical shape, although small amounts of irregular particles, partly broken particles and particles formed by coalescence of more than two spherical particles may be present. The amount of the glass spheres to be incorporated in the compositions of the invention is in the range from 10 to 1000 parts by weight or, preferably, from 50 to 500 parts by weight per 100 parts by weight of the organopolysiloxane resin in the case where the glass spheres are void-free glass beads. Smaller amounts of the glass beads than 10 parts by weight per 100 parts by weight of the resin gives only insufficient attainment of the effects of glass spheres and larger amounts of the glass beads than 1,000 parts by weight result in too high consistency of the compositions which brings about difficulties in the performance of molding. When hollow glass spheres are used as the spherical glass bodies, preferred amounts may vary in accordance with their bulk densities but, as a rule, the volume ratio is taken as a measure by adjusting it to nearly the same value as in the case of glass beads.

The molding compositions of the present invention are easily prepared by any of the known procedures for the preparation of other types of resin molding compositions. For example, the organopolysiloxane resin, the spherical glass bodies and other additives, if necessary, are thoroughly blended and mixed by means of a blending machine such as hot roller mills, kneaders, Bumbury's mixers and high-speed blenders, heated at a temperature higher than the melting point of the organopolysiloxane resin. Alternatively, substrate materials composed of glass fibers, including glass rovings, glass yarns, glass cloths and glass mats, are impregnated by spraying, dipping or brushing with a dispersion prepared by dissolving the organopolysiloxane resin and dispersing the spherical glass bodies in a suitable organic solvent such as trichloroethylene with subsequent evaporation of the solvent and cutting of the substrate materials into pieces 1 to 6 mm long which serve as the molding composition to be supplied to the press molding process. In still another embodiment of the invention, the compositions are processed into prepregs for lamination molding by any suitable known means.

The curing catalysts employed for the curing of the molding composition from the vinyl polymerization type resins of the present invention are also conventional ones including organic peroxides such as benzoyl peroxide and dicumyl peroxide, while those employed for the curing of the molding composition from the condensation curing type resins include amines such as monoethanolamine and triethanolamine and metal organic compounds such as zinc octoate, lead octoate and dibutyltin dilaurate.

The above-mentioned curing catalysts for the organopolysiloxanes of the condensation curing type can be dispensed with when the spherical glass bodies are alkaline such that the pH value of water containing 4% by weight of said spherical glass bodies dispersed therein is from 8.0 to 11.0 at 25° C. The organopolysiloxanes suitable for the curing without addition of curing catalysts by utilizing the spherical glass bodies as specified above are those of the condensation curing type represented by the general formula above, wherein the molar ratio of the organic groups denoted by R to the silicon atoms, R/Si, is from 1.0 to 1.6 and containing at least 0.25% by weight of hydroxy groups directly bonded to silicon atoms. The spherical glass bodies of the kind are glass beads and hollow glass spheres manufactured from alkali glass.

The molded articles obtained by use of the silicone resin-based molding compositions as described above are especially suitable for various kinds of parts in medical instruments and electric devices for household use, e.g. cooking apparatus such as microwave ovens, where safety and health problems are of utmost importance, because they are obtained without the addition of any conventional curing catalysts which are often compounds of poisonous heavy metals.

The dimensional stability, mechanical strengths, thermal stability and other properties can be further improved by addition of several kinds of other fillers or reinforcing materials exemplified by chopped glass fibers.

Other additives to be incorporated in the molding compositions of the present invention may include small amounts of mold-release agents such as calcium stearate and zinc stearate, white or light-tone colored pigments such as titanium dioxide, and aging inhibitors.

In the following examples, parts are all parts by weight and the properties of the molding compositions or the molded articles prepared therefrom were individually tested by the standards specified below.

Spiral flow test: E.M.M.I. (Epoxy Molding Materials Institute)

Hardness : Rockwell hardness tester, scale M

Flexural strength : JIS K 6911 (equivalent to ASTM D790-58T)

Breakdown voltage : JIS K 6911 (equivalent to ASTM D149-55T)

Cup flow test : JIS K 6911 (equivalent to ASTM D731-57)

EXAMPLE 1

One part of an organopolysiloxane resin composed of 50 mole % of monomethyl siloxane units $CH_3SiO_{1.5}$, 35 mole % of monophenyl siloxane units $C_6H_5SiO_{1.5}$ and 15 mole % of diphenyl siloxane units $(C_6H_5)_2SiO$ and containing 0.8% by weight of hydroxy groups directly bonded to the silicon atoms was admixed with 2.0 parts of glass beads having the average particle diameter 30 $\mu m$ and density of the glass 2.45, 0.1 part of titanium dioxide and 0.01 part of calcium stearate, blended together with a hot roller mill heated at 80° C for 5 minutes, further admixed with 1.0 part of glass fiber strands chopped in a 6 mm length and milled for additional 3 minutes. To the resulting blend, 0.005 part of lead carbonate and 0.008 part of 2-ethylhexanoic acid were added and the blend was again milled for one minute. The resulting composition was spread into sheets, cooled and crushed to granules suitable for feeding transfer molding machines. The granulated composition thus prepared was fabricated by transfer molding into disks of 50 mm diameter and 3 mm thickness, the properties of which along with the result of the spiral flow test of the composition are shown in Table 1 to follow.

As a control, another composition for transfer molding was prepared in the same formulation as described above except that the glass beads employed above were replaced by the same amount of fused quartz powder. The granules of this control composition had the appearance of disagreeable grayish color, and the properties of the molded articles obtained therefrom are also shown in Table 1.

Table 1

|  | Present invention | Control |
| --- | --- | --- |
| Spiral flow, cm | 58 | 60 |
| Hardness | 85 | 85 |
| Flexural strength, kg/mm² | 5.5 | 5.8 |
| Breakdown voltage, kV/mm | 18.5 | 17.5 |
| Appearance of the disks | White, no stains | Black stains in streaks along the flow lines of the composition |

EXAMPLE 2

One part of an organopolysiloxane resin composed of 30 mole % of monovinyl siloxane units $(CH_2=CH)SiO_{1.5}$, 40 mole % of monophenyl siloxane units $C_6H_5SiO_{1.5}$ and 30 mole % of dimethyl siloxane units $(CH_3)_2SiO$ was admixed with 2.0 parts of glass beads having the average particle diameter 30 $\mu m$ and the density of the glass 2.45, 0.1 part of titanium dioxide and 0.01 part of calcium stearate, blended at 70° C for 5 minutes, further admixed with 1.0 part of glass fiber strands chopped in 6 mm length and blended again for additional 3 minutes. To the resulting blend, 0.01 part of dicumyl peroxide was added and the composition was milled for another one minute, spread into sheets, cooled and then crushed to granules suitable for feeding transfer molding machines. This molding composition was fabricated into disks of 50 mm diameter and 3 mm thickness, the properties of which are shown in Table 2.

Table 2

|  | Present invention |
| --- | --- |
| Spiral flow, cm | 50 |
| Hardness | 80 |
| Flexural strength, kg/mm² | 5.0 |
| Appearance of the disks | White, no stains |

Table 4

|  | Present invention |
| --- | --- |
| Hardness | 88 |
| Flexural strength, kg/mm² | 6.0 |
| Breakdown voltage, kV/mm | 18.0 |
| Appearance of the disks | White, no stains |

EXAMPLE 3

One part of the organopolysiloxane resin employed in Example 1, 0.07 part of hollow glass spheres of the average particle diameter 60 μm and the bulk density 0.33, 0.05 part of titanium dioxide, 0.01 part of zinc stearate and a combined curing catalyst of 0.01 part of monoethanolamine and 0.01 part of 2-ethylhexanoic acid were dissolved or dispersed in 2 parts of trichloroethylene. Glass fiber rovings (ERS-2310-116B, tradename by Central Glass Co.) were impregnated with the dispersion by coating to such an extent that the pick-up of the composition on the glass fiber was 50% by weight of the glass fiber and the solvent was evaporated to dryness. The glass fiber rovings thus impregnated were then chopped in a 6 mm length of give composition suitable for press molding. The composition was press molded into test pieces of the dimensions as specified in JIS K 6911 for cup flow test and the properties of them are shown in Table 3.

As a control, another composition for press molding was prepared in the same formulation as above except that the hollow glass spheres were replaced by 0.5 part of diatomaceous earth. This composition had black stains at the sections and the test pieces fabricated therefrom had the propertie as shown in Table 3.

Table 3

|  | Present invention | Control |
| --- | --- | --- |
| Hardness | 85 | 85 |
| Flexural strength, kg/mm² | 13.5 | 13.0 |
| Breakdown voltage, kV/mm | 14.0 | 13.0 |
| Appearance of the test pieces | White, no stains | Black stains in streaks along the flow line of the composition |

EXAMPLE 4

One part of an organopolysiloxane resin composed of 25 mole % of monomethyl siloxane units $CH_3SiO_{1.5}$, 35 mole % of monophenyl siloxane units $C_6H_5SiO_{1.5}$, 35 mole % of dimethyl siloxane units $(CH_3)_2SiO$ and 5 mole % of diphenyl siloxane units $(C_6H_5)_2SiO$ and containing 0.5 % by weight of hydroxy groups directly bonded to the silicon atoms, 1.0 part of hollow glass spheres of average particle diameter 60 μm and bulk density 0.33, 0.1 part of titanium dioxide, 0.01 part of calcium stearate, 0.003 part of lead carbonate, 0.005 part of benzoic acid and 1.5 parts of chopped glass fiber were charged together into a high-speed blender and blended well at a speed of 760 r.p.m. while the temperature was elevated to 100° C. The composition was transformed into granules of about 10 mesh size after 20 minutes from the beginning of the blender operation. The granulated composition was taken out from the blender after cooling a fabricated into disks of 50 mm diameter and 3 mm thickness by injection molding. The properties of the disks are shown in Table 4.

EXAMPLE 5

One hundred parts of an organopolysiloxane resin wherein the organic groups are methyl and phenyl groups with the organic group to silicon molar ratio, R/Si, is 1.10 and methyl group to phenyl group molar ratio, $CH_3/C_6H_5$, is 0.80 and containing 3.1% by weight of hydroxy groups directly bonded to the silicon atoms and 5.3% by weight of methoxy groups bonded to the silicon atoms, 50 parts of alkaline glass beads such that the pH value of water containing 4% by weight of them dispersed therein was 9.7 at 25° C and with the particle size distribution from 5 μm to 44 μm, 10 parts of titanium dioxide and 0.5 part of stearic acid were dissolved or dispersed in 200 parts of toluene. Glass rovings of alkali-free glass fibers were impregnated with the dispersion above prepared by dipping with subsequent evaporation of toluene to dryness with hot air and chopped into pieces with 6 mm length which served as the silicone resin-based molding material for press molding.

This molding material was fabricated into disks of a 100 mm diameter and 3 mm thickness by press molding with the conditions of the temperature of metallic mold 180° C, molding pressure 200 kg/cm² and molding time 5 minutes. The disks here obtained were free from blisters and delamination and had the properties shown below.

Breakdown voltage : 11 kV/mm
Weight loss on heating : 1.4% by weight and no changes in appearance after 10 days at 300° C.
Flexural strength : 11.5 kg/mm²
Poison test : O.K. by the test for heavy metals in plastics wares and packaging materials in accordance with the Regulation No. 370 by the Japanese Ministry of Welfare for the specification of food additives.

What is claimed is:

1. A silicone resin-based molding composition which consists essentially of an organopolysilozane represented by the general formula

$$R_nSiO_{4-n/2}$$

wherein R is a substituted or unsubstituted monovalent hydrocarbon group and n is a positive number between 1.0 and 1.6, said organopolysiloxane containing at least 0.25% by weight of residual hydroxy groups directly bonded to the silicone atoms, and spherical glass bodies which are substantially void-free glass beads or hollow glass spheres, said glass bodies having an average particle size smaller than 200 micrometers in diameter, the amount of the glass body being from 10 parts by weight to 1000 parts by weight per 100 parts by weight of the organopolysiloxane, said organopolysiloxane resin being selected from the group consisting of the condensation curing type and the vinyl polymerization type, and said spherical glass bodies being alkaline such that water containing 4% by weight thereof has a pH value from 8 to 11, and wherein said organopolysiloxane is cured without the use of any curing catalyst.

2. The silicone resin-based molding composition as claimed in claim 1 wherein said monovalent hydrocarbon group is selected from the class consisting of methyl, phenyl and vinyl groups.

3. The silicone resin-based molding composition as claimed in claim 1 wherein said organopolysiloxane contains vinyl groups bonded to the silicon atoms in an amount of 0.02 moles to 0.5 moles per mole of the silicon atoms.

* * * * *